United States Patent
Biskeborn et al.

(10) Patent No.: US 10,170,138 B2
(45) Date of Patent: Jan. 1, 2019

(54) TAPE APPARATUS HAVING AN ARRAY OF WRITE TRANSDUCERS EACH HAVING AT LEAST THREE LAYERS OF COILS

(71) Applicant: International Business Machines Corporation, Armonk, NY (US)

(72) Inventors: Robert G. Biskeborn, Hollister, CA (US); Robert E. Fontana, Jr., San Jose, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/476,835

(22) Filed: Mar. 31, 2017

(65) Prior Publication Data

US 2018/0286436 A1    Oct. 4, 2018

(51) Int. Cl.
*G11B 5/17* (2006.01)
*G11B 5/008* (2006.01)
(Continued)

(52) U.S. Cl.
CPC ............ *G11B 5/00817* (2013.01); *G11B 5/17* (2013.01); *G11B 5/187* (2013.01); *G11B 5/23* (2013.01);
(Continued)

(58) Field of Classification Search
None
See application file for complete search history.

(56) References Cited

U.S. PATENT DOCUMENTS 4,837,924 A * 6/1989 Lazzari ................ G11B 5/3106
                                                    29/603.14
5,936,814 A * 8/1999 Slade .................... G11B 5/3116
                                                    29/603.07
(Continued)

FOREIGN PATENT DOCUMENTS

JP      63273206 A  * 11/1988
JP      09180122 A  *  7/1997
JP     2004334945 A    11/2004

OTHER PUBLICATIONS

Anonymous, "Wireless Energy Transmission Using a Planar Coil Array With Minimized Mutual Coupling," ip.com, Aug. 17, 2011, pp. 1-9.

(Continued)

*Primary Examiner* — William J Klimowicz
(74) *Attorney, Agent, or Firm* — Zilka-Kotab, P.C.

(57) ABSTRACT

A magnetic recording tape writing apparatus includes an array of write transducers extending along a common tape bearing surface. Each of the write transducers has a lower pole having a lower pole tip, a lower coil layer above the lower pole, an intermediate coil layer above the lower coil layer, and an upper coil layer above the intermediate coil layer. An upper pole is positioned above the upper coil layer, the upper pole having an upper pole tip. In one embodiment, a nonmagnetic write gap is positioned between the pole tips, a plane of deposition of the write gap extending between the intermediate coil layer and the lower coil layer. In another embodiment, a nonmagnetic write gap is positioned between the pole tips, a plane of deposition of the write gap extending between the intermediate coil layer and the upper coil layer.

19 Claims, 14 Drawing Sheets

(51) Int. Cl.
*G11B 5/265* (2006.01)
*G11B 5/23* (2006.01)
*G11B 5/187* (2006.01)
*G11B 5/31* (2006.01)

(52) U.S. Cl.
CPC ............ *G11B 5/2652* (2013.01); *G11B 5/313* (2013.01); *G11B 2220/95* (2013.01)

(56) References Cited

U.S. PATENT DOCUMENTS

| | | | | |
|---|---|---|---|---|
| 6,154,346 | A * | 11/2000 | Sasaki | B82Y 10/00 360/317 |
| 6,483,662 | B1 * | 11/2002 | Thomas | G11B 5/3116 360/123.4 |
| 6,671,133 | B1 * | 12/2003 | Sasaki | B82Y 10/00 360/317 |
| 6,804,879 | B2 * | 10/2004 | Hsiao | G11B 5/17 216/22 |
| 7,079,355 | B2 | 7/2006 | Hsiao et al. | |
| 7,688,545 | B1 * | 3/2010 | Vas'Ko | G11B 5/3153 360/125.42 |
| 8,085,499 | B2 | 12/2011 | Kawato et al. | |
| 8,988,813 | B2 | 3/2015 | Ajioka | |
| 2002/0191334 | A1 * | 12/2002 | Hsu | G11B 5/313 360/123.55 |
| 2004/0080866 | A1 * | 4/2004 | Hsiao | G11B 5/17 360/123.54 |
| 2005/0083608 | A1 * | 4/2005 | Watanabe | G11B 5/1278 360/123.06 |
| 2008/0002289 | A1 * | 1/2008 | Lee | G11B 5/17 360/123.01 |
| 2012/0170156 | A1 * | 7/2012 | Sasaki | G11B 5/1278 360/319 |
| 2012/0188666 | A1 * | 7/2012 | Sasaki | G11B 5/1278 360/123.12 |
| 2012/0307397 | A1 * | 12/2012 | Biskeborn | G11B 5/00826 360/75 |
| 2014/0313614 | A1 * | 10/2014 | Hsiao | G11B 5/17 360/99.08 |
| 2015/0287515 | A1 | 10/2015 | Choi | |

OTHER PUBLICATIONS

Kryder et al., "High-Density Perpendicular Recording-Advances, Issues, and Extensibility," Journal of Magnetism and Magnetic Materials 287, Nov. 4, 2004, pp. 449-458.

* cited by examiner

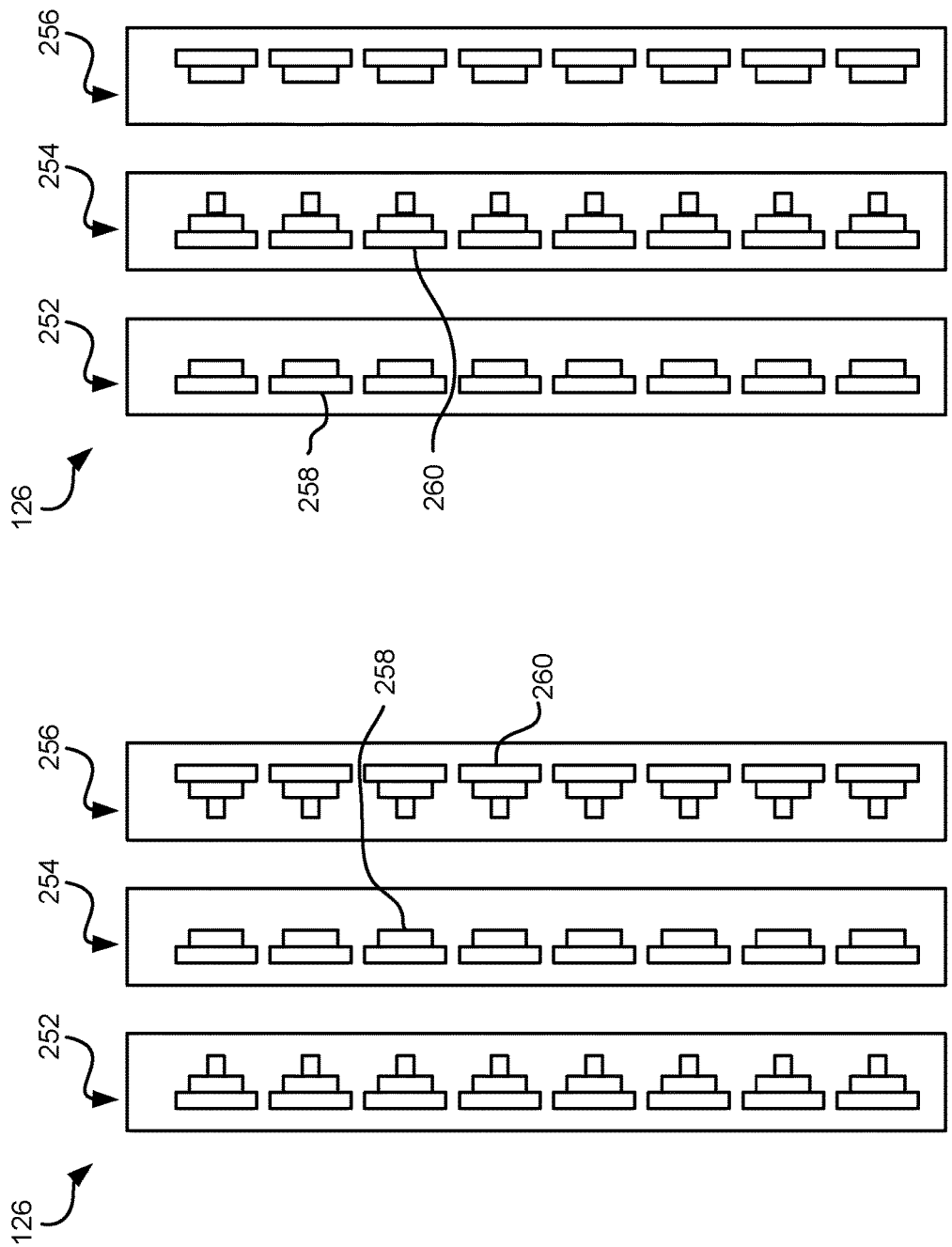

US 10,170,138 B2

TAPE APPARATUS HAVING AN ARRAY OF WRITE TRANSDUCERS EACH HAVING AT LEAST THREE LAYERS OF COILS

BACKGROUND

The present invention relates to magnetic tape-based data storage systems, and more particularly, this invention relates to a magnetic recording tape writing apparatus having write transducers each with at least three layers of coils.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed, where multiple write transducers operate at the same time to write data to the tape. However, as the spacing between the write transducers becomes smaller and smaller, problems, such as crosstalk, tend to emerge more frequently.

Crosstalk is a phenomenon that occurs when two adjacent write transducers perform writing operations at about the same time. Particularly, crosstalk is present where the written portion for a first write transducer is affected by the magnetic flux created by an adjacent second write transducer, thereby degrading or otherwise adversely affecting the written information from the first write transducer. For example, stray flux generated by a powered write transducer will take a path from the top pole to the bottom pole of the write transducer, in the surrounding space. If a second write transducer is present and close to the first write transducer, the stray flux of the powered write transducer will pass through the second write transducer, taking a path through the top and bottom poles of the second writing. As the flux passes through the second write transducer structure, a portion of it also passes through the gap of the second write transducer, and can alter the pattern written by the second write transducer, leading to degradation of the written data pattern.

The write transducers do not need to be active simultaneously; crosstalk may emerge even upon performing writing operations within a few nanoseconds of each other, depending on the write gap of the particular head being used.

SUMMARY

A magnetic recording tape writing apparatus, according to one embodiment, includes an array of write transducers extending along a common tape bearing surface. Each of the write transducers has a lower pole having a lower pole tip, a lower coil layer above the lower pole, an intermediate coil layer above the lower coil layer, and an upper coil layer above the intermediate coil layer. An upper pole is positioned above the upper coil layer, the upper pole having an upper pole tip. A nonmagnetic write gap is positioned between the pole tips, a plane of deposition of the write gap extending between the intermediate coil layer and the lower coil layer.

A magnetic recording tape writing apparatus, according to another embodiment, includes an array of write transducers extending along a common tape bearing surface. Each of the write transducers has a lower pole having a lower pole tip, a lower coil layer above the lower pole, an intermediate coil layer above the lower coil layer, and an upper coil layer above the intermediate coil layer. An upper pole is positioned above the upper coil layer, the upper pole having an upper pole tip. A nonmagnetic write gap is positioned between the pole tips, a plane of deposition of the write gap extending between the intermediate coil layer and the upper coil layer.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a magnetic recording tape writing apparatus includes an array of write transducers extending along a common tape bearing surface. Each of the write transducers has a lower pole having a lower pole tip, a lower coil layer above the lower pole, an intermediate coil layer above the lower coil layer, and an upper coil layer above the intermediate coil layer. An upper pole is positioned above the upper coil layer, the upper pole having an upper pole tip. A nonmagnetic write gap is positioned between the pole tips, a plane of deposition of the write gap extending between the intermediate coil layer and the lower coil layer.

In another general embodiment, a magnetic recording tape writing apparatus includes an array of write transducers extending along a common tape bearing surface. Each of the write transducers has a lower pole having a lower pole tip, a lower coil layer above the lower pole, an intermediate coil layer above the lower coil layer, and an upper coil layer above the intermediate coil layer. An upper pole is positioned above the upper coil layer, the upper pole having an upper pole tip. A nonmagnetic write gap is positioned between the pole tips, a plane of deposition of the write gap extending between the intermediate coil layer and the upper coil layer.

Figure 1A:
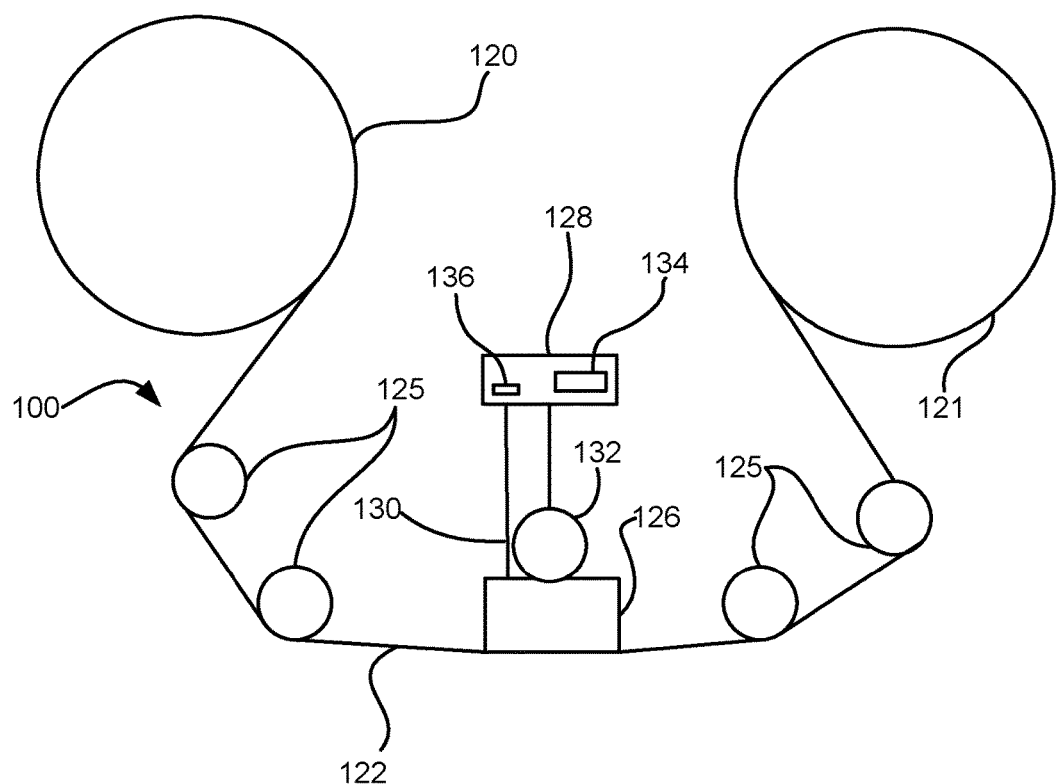
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers (read transducers), write transducers (writers), or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
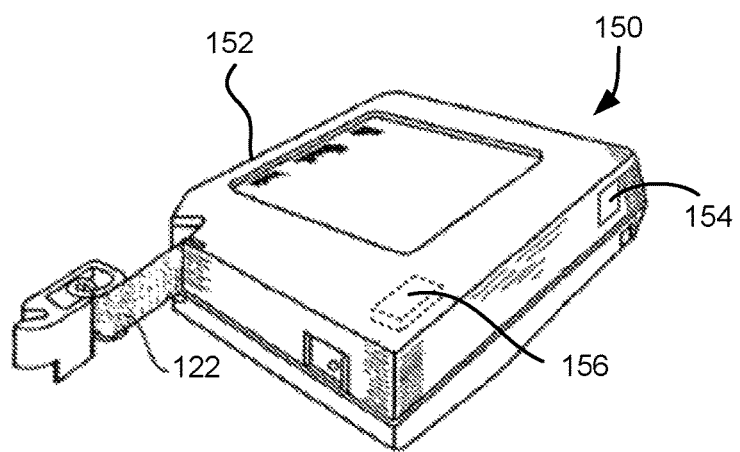
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
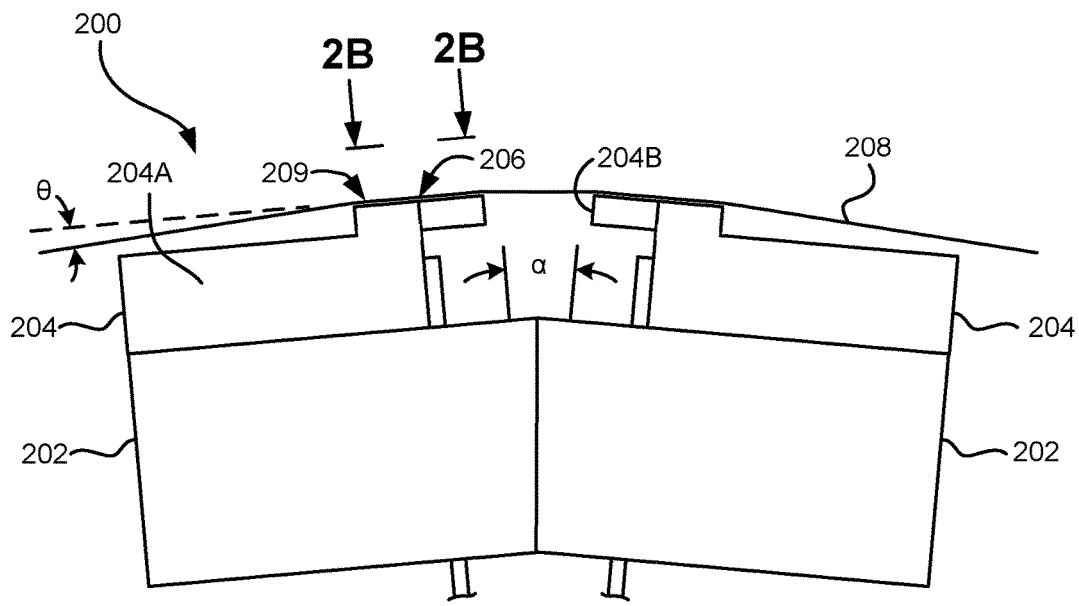
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or write transducers 206 are formed. In use, a tape 208 is moved over the modules 204 along a media (tape) bearing surface 209 in the manner shown for reading and writing data on the tape 208 using the readers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 2 write transducer 204B may be made of the same or similar ceramic as the substrates 204A.

The readers and write transducers may be arranged in a piggyback or merged configuration. An illustrative piggy-backed configuration comprises a (magnetically inductive) write transducer on top of (or below) a (magnetically shielded) reader transducer (e.g., a magnetoresistive reader, etc.), wherein the poles of the write transducer and the shields of the reader are generally separated. An illustrative merged configuration comprises one reader shield in the same physical layer as one writer pole (hence, "merged"). The readers and write transducers may also be arranged in an interleaved configuration. Alternatively, each array of channels may be readers or write transducers only. Any of these arrays may contain one or more servo track readers for reading servo data on the medium.

Figure 2B:
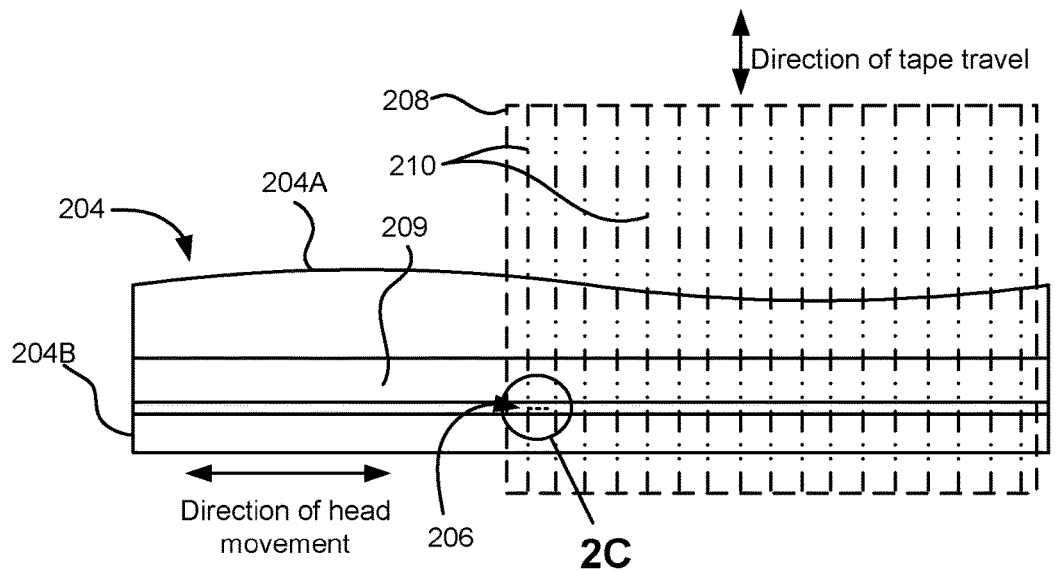
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or write transducers 206 are positioned to specific track positions within one of the data bands. Outer readers, sometimes called servo readers, read the servo tracks 210. The servo signals are in turn used to keep the readers and/or write transducers 206 aligned with a particular set of tracks during the read/write operations.

Figure 2C:
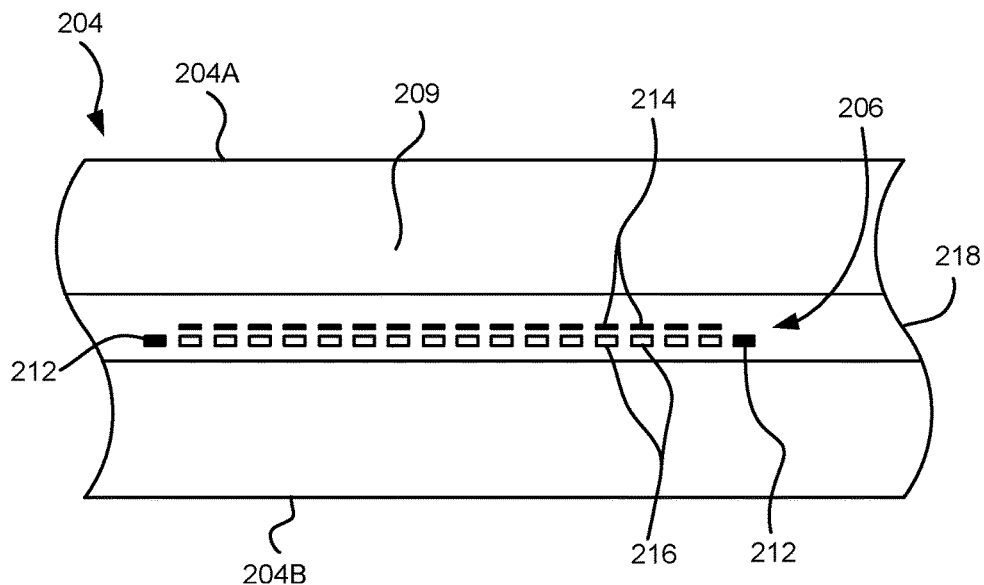
FIG. 2C is a detailed view taken from Circle 2C of FIG. 2B.

FIG. 2C depicts a plurality of readers and/or write transducers 206 formed in a gap 218 on the module 204 in Circle 2C of FIG. 2B. As shown, the array of readers and write transducers 206 includes, for example, 16 write transducers 214, 16 readers 216 and two servo readers 212, though the number of elements may vary. Illustrative embodiments include 8, 16, 32, 40, and 64 active readers and/or write transducers 206 per array, and alternatively interleaved designs having odd numbers of reader or write transducers such as 17, 25, 33, etc. An illustrative embodiment includes 32 readers per array and/or 32 write transducers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the read and write transducers may be arranged in a piggyback configuration as shown in FIG. 2C, the readers 216 and write transducers 214 may also be arranged in an interleaved configuration. Alternatively, each array of readers and/or write transducers 206 may be readers or write transducers only, and the arrays may contain one or more servo readers 212. As noted by considering FIGS. 2A and 2B-2C together, each module 204 may include a complementary set of readers and/or write transducers 206 for such things as bi-directional reading and writing, read-while-write capability, backward compatibility, etc.

Figure 2D:
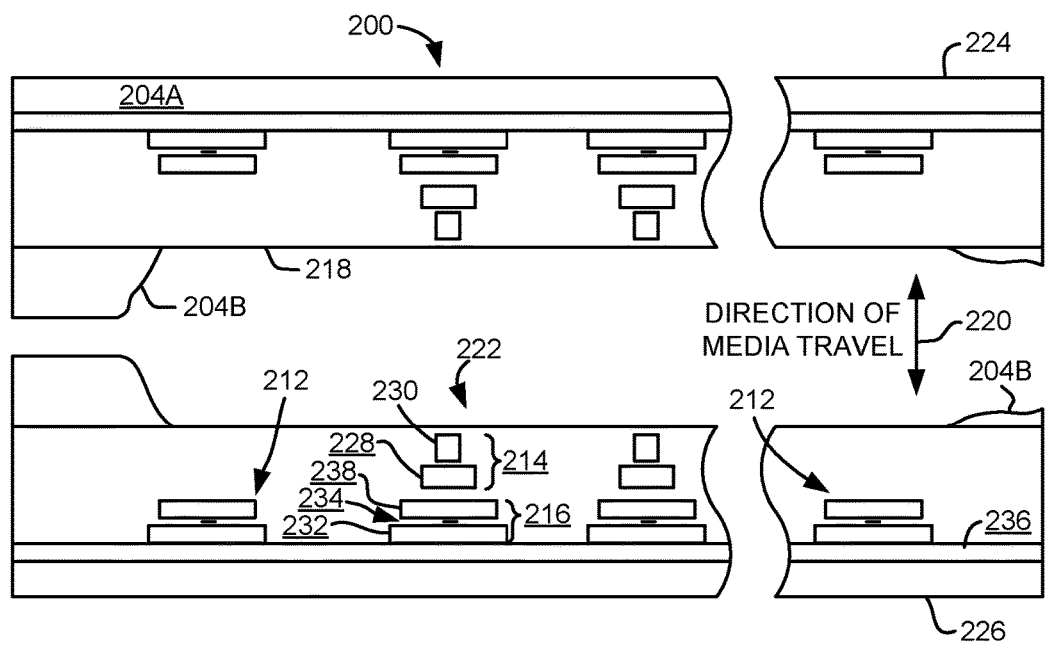
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The write transducers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and reader of the trailing module aligned with the write transducer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (−), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
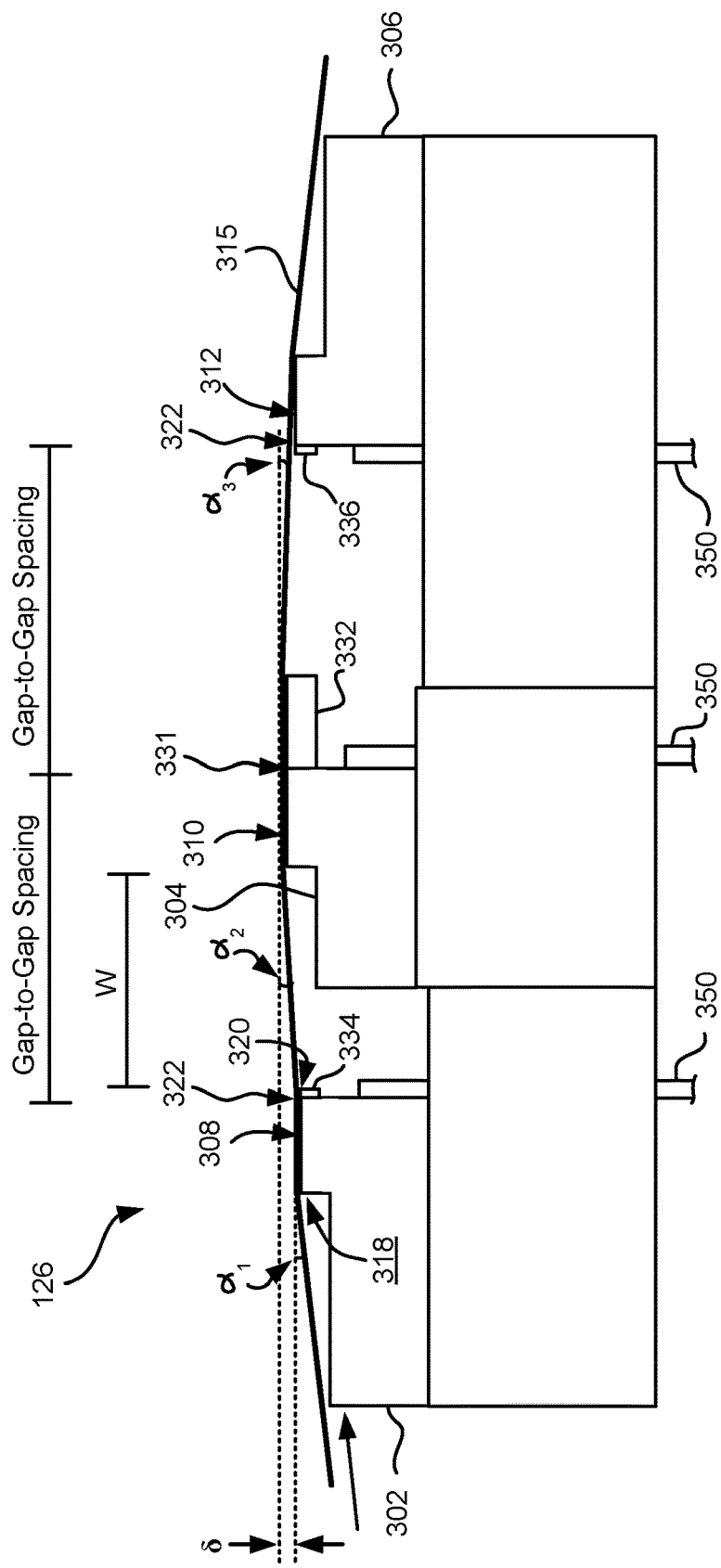
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also, note that the outer modules 302, 306 will alternate as leading modules, depending on the direction of travel of the tape 315.

Figure 6:
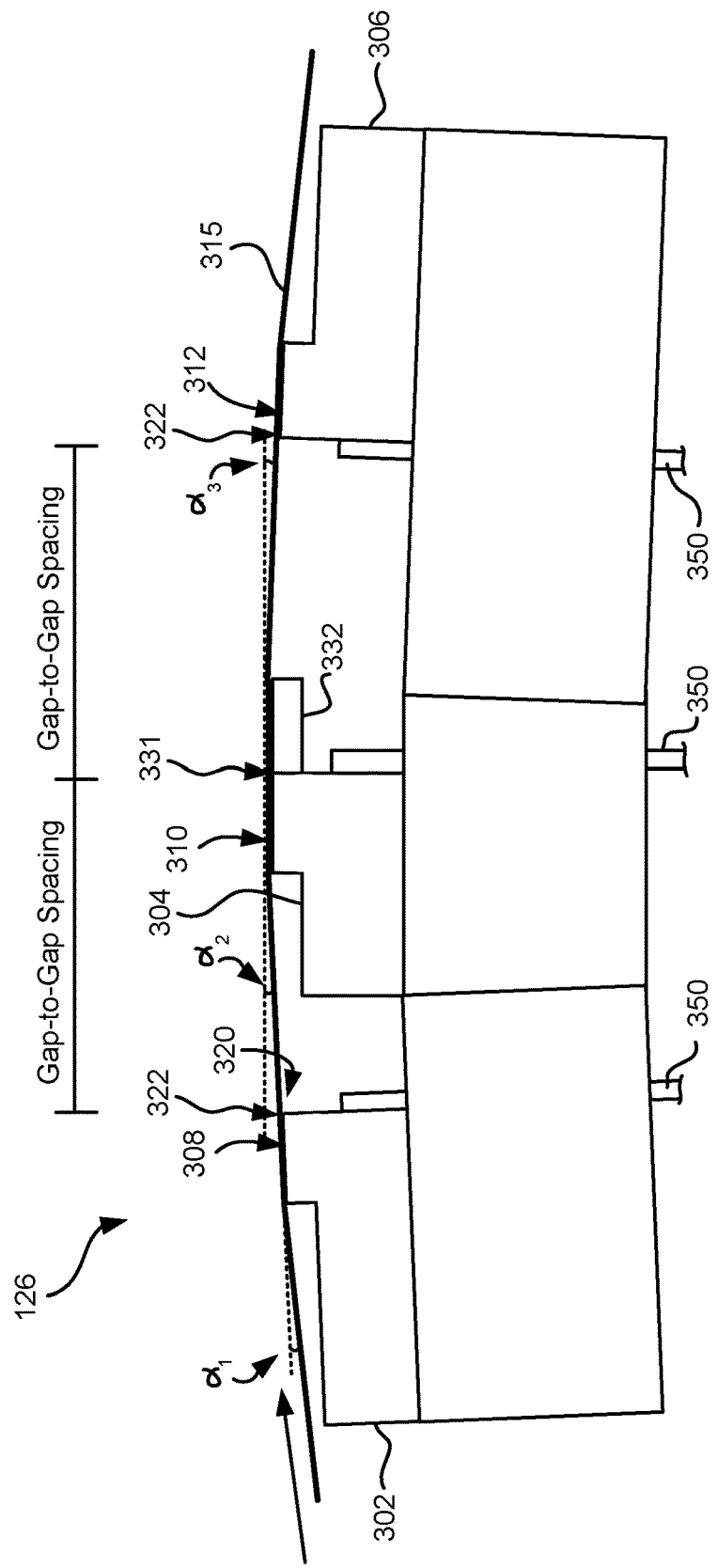
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no write transducers. The first and third modules 302, 306 include a plurality of write transducers 322 and no data readers, with the exception that the outer modules 302, 306 may include optional servo readers. The servo readers may be used to position the head during reading and/or writing operations. The servo reader(s) on each module are typically located towards the end of the array of readers or write transducers.

By having only readers or side by side write transducers and servo readers in the gap between the substrate and closure, the gap length can be substantially reduced. Typical heads have piggybacked readers and write transducers, where the write transducer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
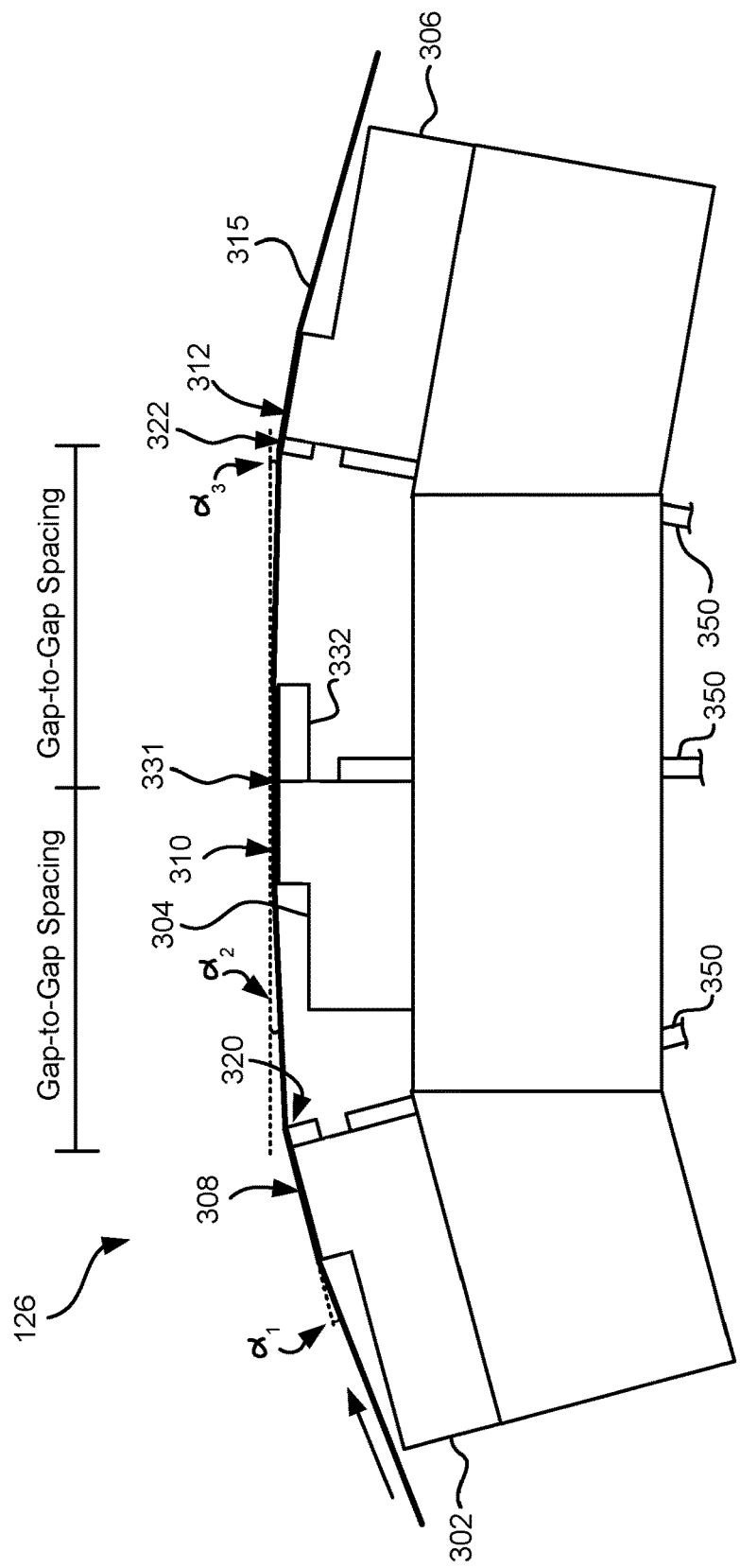
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
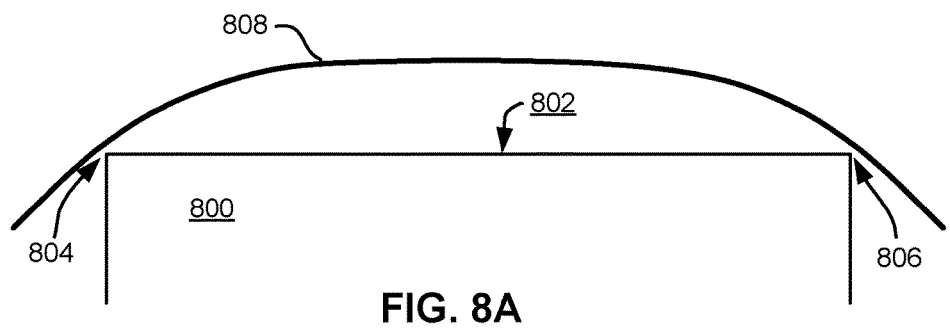
FIGS. 8A-8C are schematics depicting the principles of tape tenting.
Figure 8B:
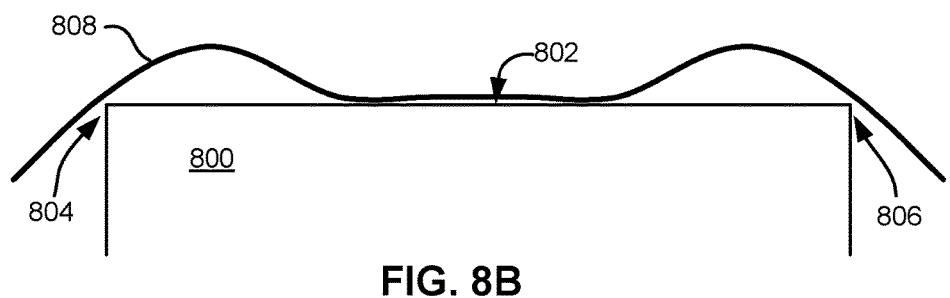
Figure 8C:
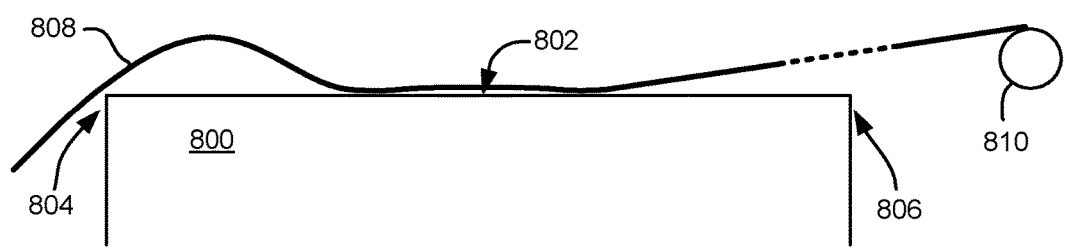

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
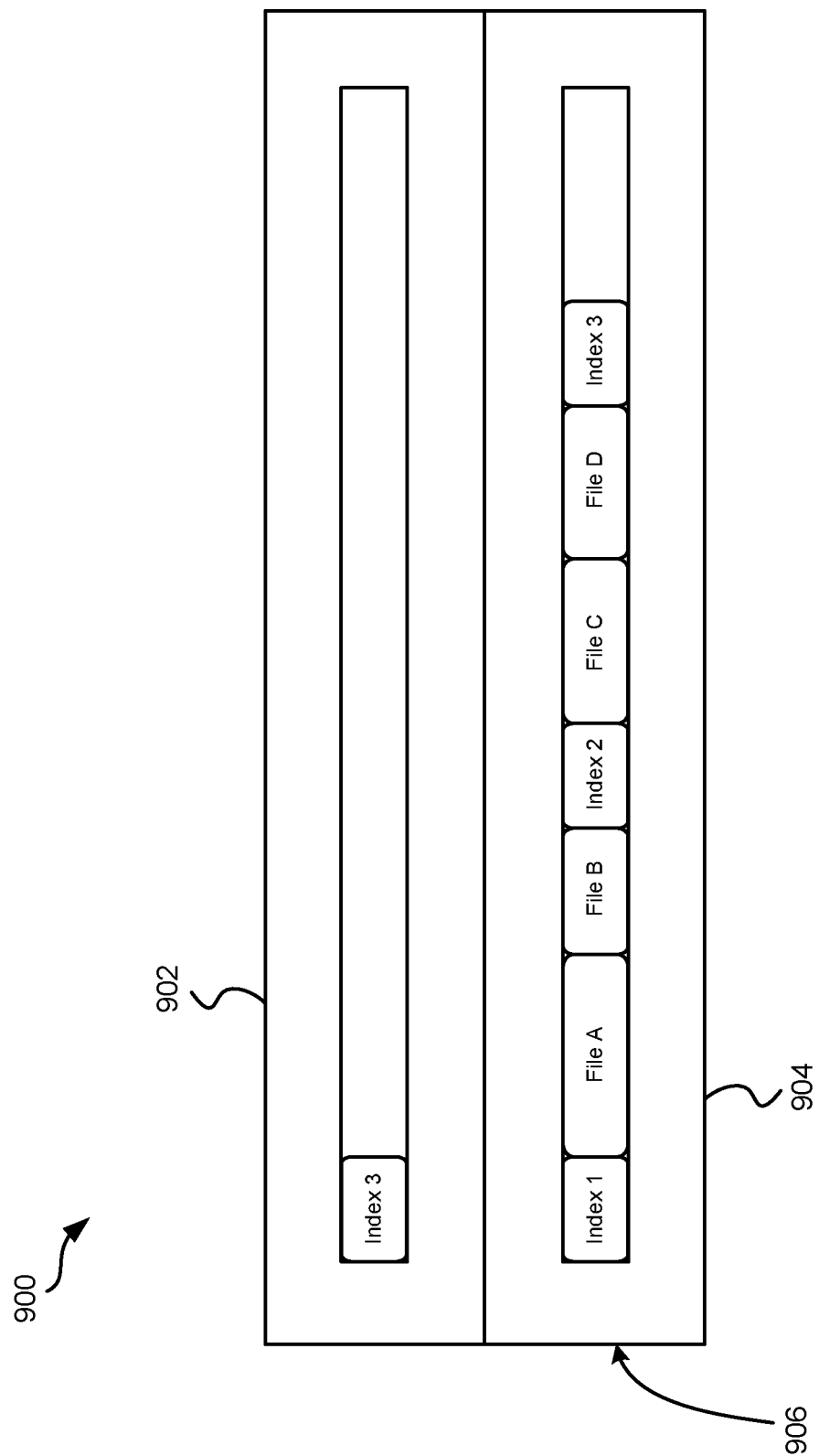
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 differently depending on the desired embodiment. According to some embodiments, the metadata of the index partition 902 may be updated in response to the tape being unmounted, e.g., such that the index may be read from the index partition when that tape is mounted again. The metadata may also be written in the data partition 902 so the tape may be mounted using the metadata recorded in the data partition 902, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As noted above, the development of small footprint, higher performance tape drive systems has created various problems in the design of a tape head assembly for use in such systems. For example, as write transducers are brought closer together, crosstalk between the write coils of adjacent write transducers becomes an issue. Possible approaches contemplated to reduce the lateral extent of the coils included reducing the number of coil turns per layer. However, this requires more output current to drive the write transducer. The drive circuitry in the tape electronics are voltage limited, so extra current is not available. Reducing the coil linewidth increases the resistance of the coil and again creates current limitations on the tape electronics since voltage limitations cannot accommodate increased coil resistance. Finally, reducing the spacing between coil lines reduces spacing, but creates limitations on process yield due to lithographic tolerances.

Preferred embodiments include an array of write transducers each having at least three layers of coils. Compared to a two-coil-layer design, the number of coil turns in each layer may be reduced, thereby resulting in a lateral reduction of overall coil width. For example, stacking the coils may reduce the number of coil turns from, e.g., 7+6 to 5+5+3, so the lateral extent of the coil is reduced by at least two turns (two linewidths and two spaces) per coil side. In one approach, a width of each coil, measured along a respective plane of deposition thereof in a track width direction, is less than 44 microns. In another approach, a width of each coil, measured along a respective plane of deposition thereof in a track width direction, is less than 42 microns.

Such embodiments are particularly useful in 64 channel or higher head designs in tape recording apparatuses. The middle coil(s) may be located above or below the write gap, with a location below the write gap preferred to ensure the integrity of the pole tip feature. The coil design may be extended to coil layer numbers greater than three in some embodiments, e.g., to four or five layers of coils.

The use of greater than two coil layers minimizes the lateral extent of the coils so that write elements can be packed closer together. This allows for more efficient design of multi-channel tape heads that support greater than 32 channels, e.g., 48, 64, 128, etc. For example, the lateral reduction of coil extent allows for closer packing of the write elements in multi-track designs.

An additional benefit of various embodiments disclosed herein is that said embodiments exhibit faster switching times, due to the ability to shorten the yokes due to less coil turns being present in a given layer.

In addition, to ensure bit stability, future magnetic tape media will likely be adjusted for higher anisotropy (Hk), which will require higher fields from the write head and hence more magnetic force from the head as defined by n (the number of turns)×I (the current into the coil). Various embodiments presented herein enable use of more turns while remaining within a smaller footprint.

Figure 10:
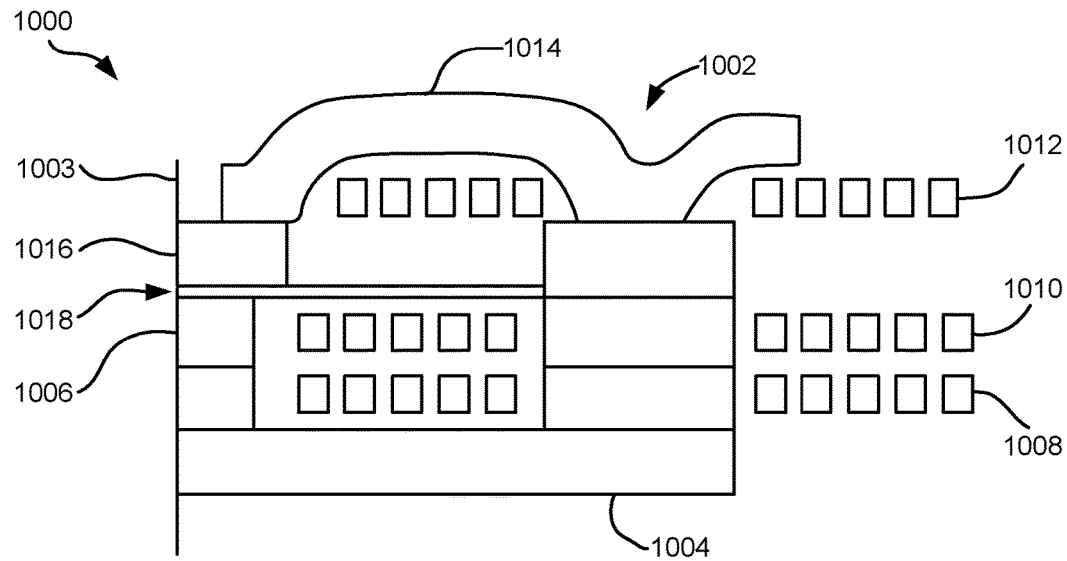
FIG. 10 depicts a magnetic recording tape writing apparatus having multiple write coil layers where an intermediate coil layer is positioned below the write gap, in accordance with one embodiment.

FIG. 10 depicts a magnetic recording tape writing apparatus 1000 having multiple write coil layers where an intermediate coil layer is positioned below the write gap, in accordance with one embodiment. As an option, the present apparatus 1000 may be implemented in conjunction with features from any other embodiment listed herein, such as those described with reference to the other FIGS. Of course, however, such apparatus 1000 and others presented herein may be used in various applications and/or in permutations which may or may not be specifically described in the illustrative embodiments listed herein. Further, the apparatus 1000 presented herein may be used in any desired environment. Except as otherwise described herein, the various layers may be of conventional materials and formed by adaptation of conventional processes to form the particular structures described herein.

The apparatus 1000 includes an array of write transducers 1002 extending along a common tape bearing surface 1003. Such array may have an arrangement similar to that shown in other FIGS. Each of the write transducers has a lower pole 1004 having a lower pole tip 1006. A lower coil layer 1008 is positioned above the lower pole 1004. An intermediate coil layer 1010 is positioned above the lower coil layer 1008. An upper coil layer 1012 is positioned above the intermediate coil layer 1010. An upper pole 1014 is positioned above the upper coil layer 1012, the upper pole having an upper pole tip 1016. A nonmagnetic write gap 1018 is located between the pole tips 1006, 1016. The plane of deposition of the write gap 1018 extends horizontally in FIG. 10 between the intermediate coil layer 1010 and the upper coil layer 1012.

Figure 15:
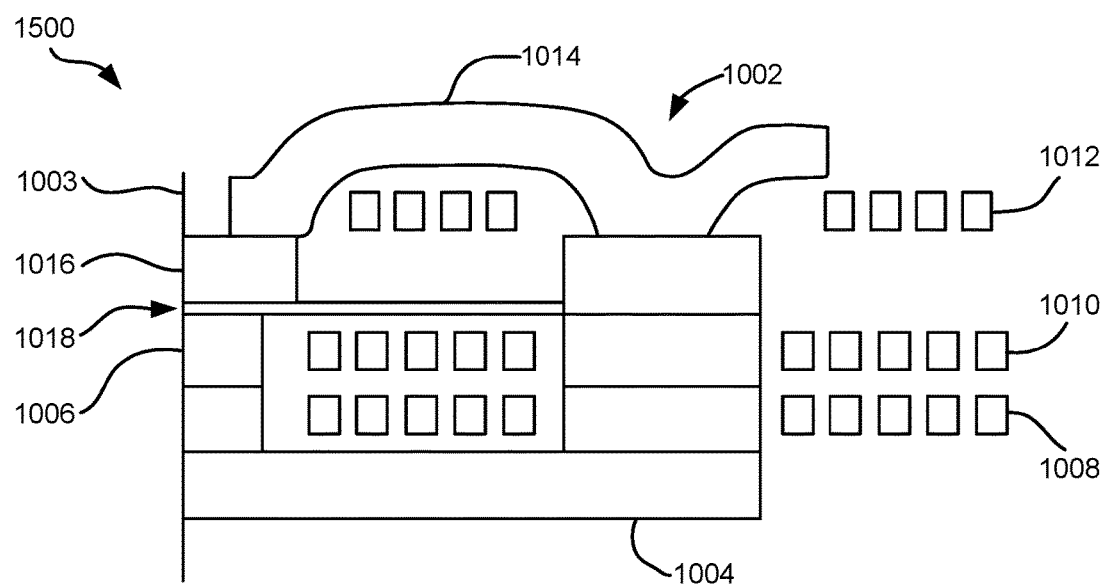
FIG. 15 depicts a magnetic recording tape writing apparatus having multiple write coil layers, in accordance with one embodiment.

As shown in FIG. 10, there are three coil layers 1008, 1010, 1012 of five turns each for a total of 15 turns. However, the number of coil turns present in a given layer may vary, depending on the particular design of the write transducer. For example, the intermediate and lower coil layers may each have five turns, while the upper coil layer may have three or four turns, e.g., as shown in the structure 1500 of FIG. 15, which has common numbering with FIG. 10 for common components.

Comparing the 15-turn write transducer 1002 to a write transducer having two coil layers of seven and eight turns respectively, and considering that typical coil pitches are currently about 2.5 µm, removing three turns from the lateral extent of the coil results in increasing the separation of outer coil turns from adjacent write transducers by an additional 15 µm. In one embodiment, a width of each coil, measured along a respective plane of deposition thereof in a track width direction, is less than 44 microns. In another embodiment, a width of each coil, measured along a respective plane of deposition thereof in a track width direction, is less than 42 microns.

Figure 11:
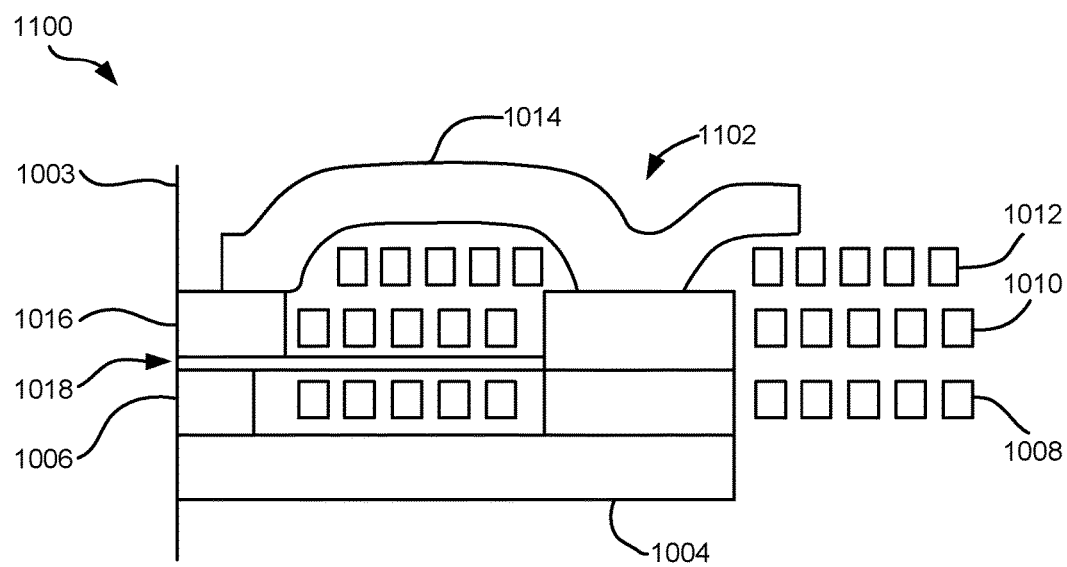
FIG. 11 depicts a magnetic recording tape writing apparatus having multiple write coil layers where an intermediate coil layer is positioned above the write gap, in accordance with one embodiment.

FIG. 11 depicts a magnetic recording tape writing apparatus 1100 having multiple write coil layers where an intermediate coil layer is positioned above the write gap, in accordance with one embodiment. As an option, the present apparatus 1100 may be implemented in conjunction with features from any other embodiment listed herein, such as those described with reference to the other FIGS. Of course, however, such apparatus 1100 and others presented herein may be used in various applications and/or in permutations which may or may not be specifically described in the illustrative embodiments listed herein. Further, the apparatus 1100 presented herein may be used in any desired environment. Except as otherwise described herein, the various layers may be of conventional materials and formed by adaptation of conventional processes to form the particular structures described herein.

Many of the elements of apparatus 1100 are similar to those of apparatus 1000 of FIG. 10, and therefore have common numbering therewith.

Referring to FIG. 11, the apparatus 1100 includes an array of write transducers 1102 extending along a common tape bearing surface 1003. Such array may have an arrangement similar to that shown in other FIGS. Each of the write transducers has a lower pole 1004 having a lower pole tip 1006. A lower coil layer 1008 is positioned above the lower pole 1004. An intermediate coil layer 1010 is positioned above the lower coil layer 1008. An upper coil layer 1012 is positioned above the intermediate coil layer 1010. An upper pole 1014 is positioned above the upper coil layer 1012, the upper pole having an upper pole tip 1016. A nonmagnetic write gap 1018 is located between the pole tips 1006, 1016. The plane of deposition of the write gap 1018 extends horizontally in FIG. 11 between the intermediate coil layer 1010 and the upper coil layer 1012.

While the embodiment shown in FIG. 11 may provide a more compact head structure, e.g., less magnetic material surrounding the coils, it may create process difficulties by requiring processing of the intermediate coil layer 1010 after the upper pole tip 1016 has been formed but before the upper pole tip 1016 has been encapsulated and its top surface planarized. The pole tip dimension at the tape bearing surface defines the trackwidth of the written data track.

Figure 12A:
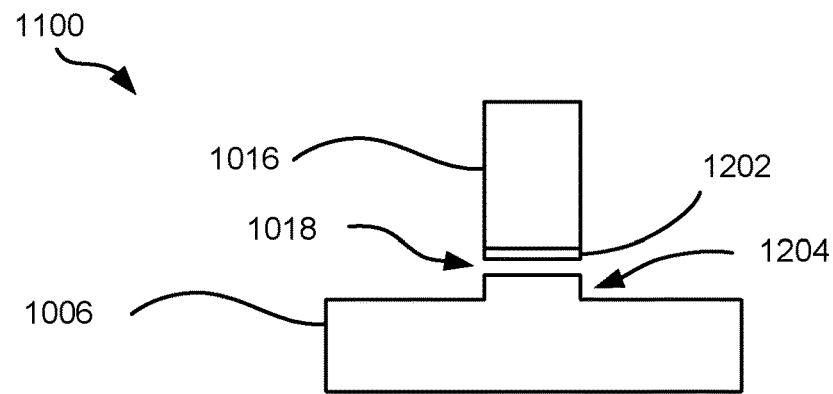
FIGS. 12A-12C are partial tape bearing surface views of variants of the apparatus of FIG. 11.
Figure 12B:
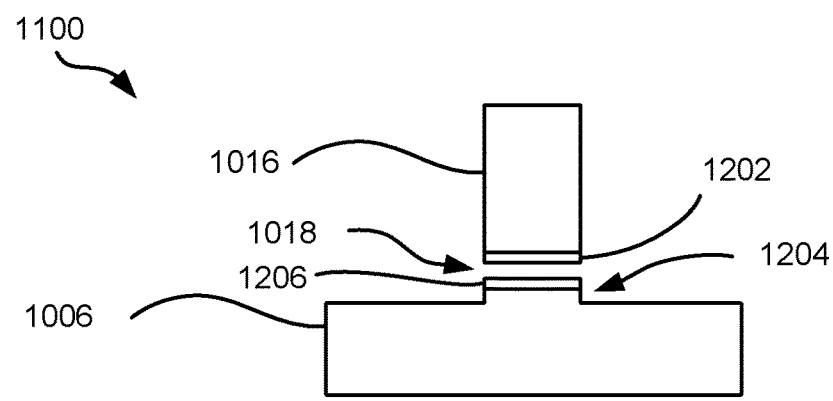
Figure 12C:
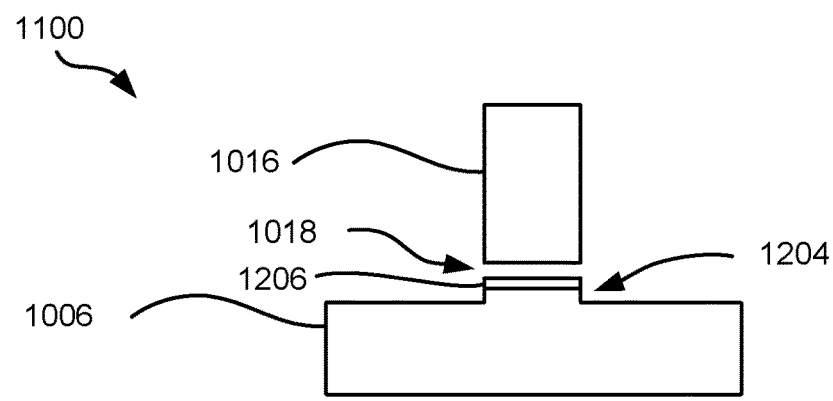

In addition, as shown in FIG. 12A, which is a tape bearing surface view of apparatus 1100, the upper pole tip 1016 preferably comprises a layer 1202 of high moment material, e.g., Co-based material, that can corrode during wafer processing if not properly encapsulated. Moreover, the lower pole tip 1006 may also include a layer 1206 of high moment material, e.g., Co-based material, e.g., as shown in FIG. 12B. FIG. 12C depicts yet another variation in which the high moment layer 1206 is present on the lower pole tip only.

Finally, the upper pole tip 1016 may undergo processing to create a notched feature 1204 below the write gap 1018. However, adding a coil layer on the write gap surface may not allow formation of the notched feature.

The design shown in FIG. 10 with the intermediate coil layer 1010 located below the write gap 1018 eliminates the potential processing disadvantages associated with the design shown in FIG. 11, since the intermediate coil layer 1010 is processed before the pole tip 1016 is processed. Furthermore, the processing for the intermediate coil layer 1010 may be identical to the processing used to form the lower layer coil 1008. Also, by processing the intermediate coil layer 1010 below the write gap 1018, all subsequent head processing may be conventional. Accordingly, no additional process development is required in some approaches.

FIGS. 13A-D depict a method 1300 for fabricating the write transducer 1002 shown in FIG. 10, according to one embodiment. As an option, variations of the present method 1300 may be implemented to construct structures such as those shown in the other FIGS. described herein. Of course, however, this method 1300 and others presented herein may be used to [form structures for a wide variety of devices and/or purposes, provide applications] which may or may not be related to the illustrative embodiments listed herein. Further, the methods presented herein may be carried out in any desired environment. Moreover, more or less operations than those shown in FIG. 1300 may be included in method 1300, according to various embodiments. It should also be noted that any of the aforementioned features may be used in any of the embodiments described in accordance with the various methods. Moreover, conventional techniques may be used in the method 1300.

Figure 13A:
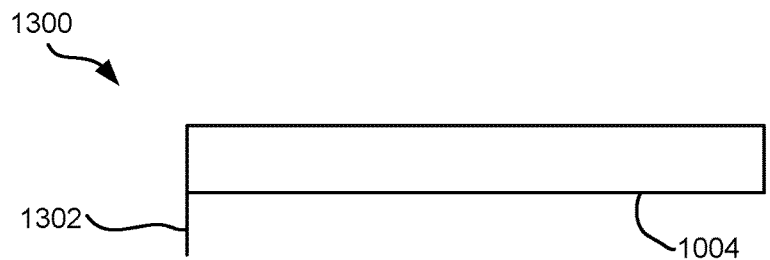
FIGS. 13A-13D depict a method for fabricating a write transducers of the apparatus shown in FIG. 10, according to one embodiment.

Referring to FIG. 13A, the lower pole 1004 is formed, e.g., by plating, on a conventional substrate 1302. The upper surface of the lower pole 1004 and surrounding material (not shown for simplicity) may be planarized.

Figure 13B:
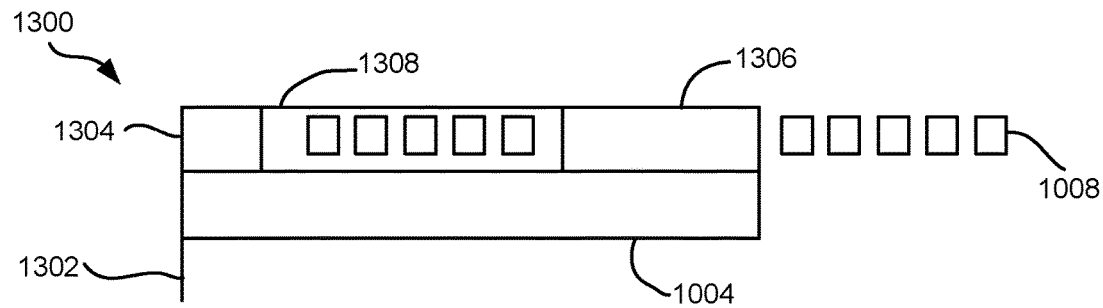

As shown in FIG. 13B, magnetic studs 1304, 1306 are formed, e.g., by plating. The lower coil layer 1008 and a corresponding electrical insulation layer 1308 are also formed, e.g., by plating and sputtering, respectively. In one approach, the insulation layer 1308 may be formed first, etched to define channels for the coils, and then the coils plated into the channels. In another approach, masking may be used to form the coils, followed by removal of the mask and formation of the insulation layer 1308. The resulting structure is preferably planarized.

Figure 13C:
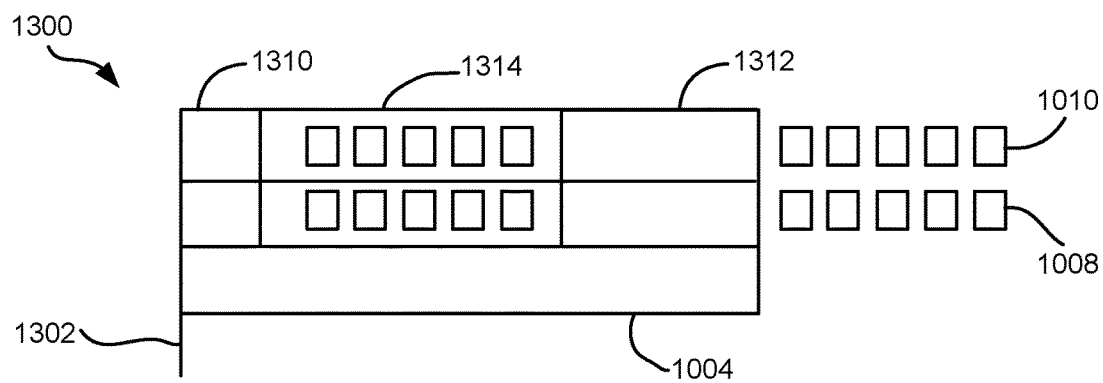

As shown in FIG. 13C, magnetic studs 1310, 1312 are formed above the previously-formed studs, e.g., by plating. The intermediate coil layer 1010 and a corresponding electrical insulation layer 1314 are also formed, e.g., by plating and sputtering, respectively. Similar techniques as described above with reference to FIG. 13B may be used in some approaches. The resulting structure is preferably planarized.

Figure 13D:
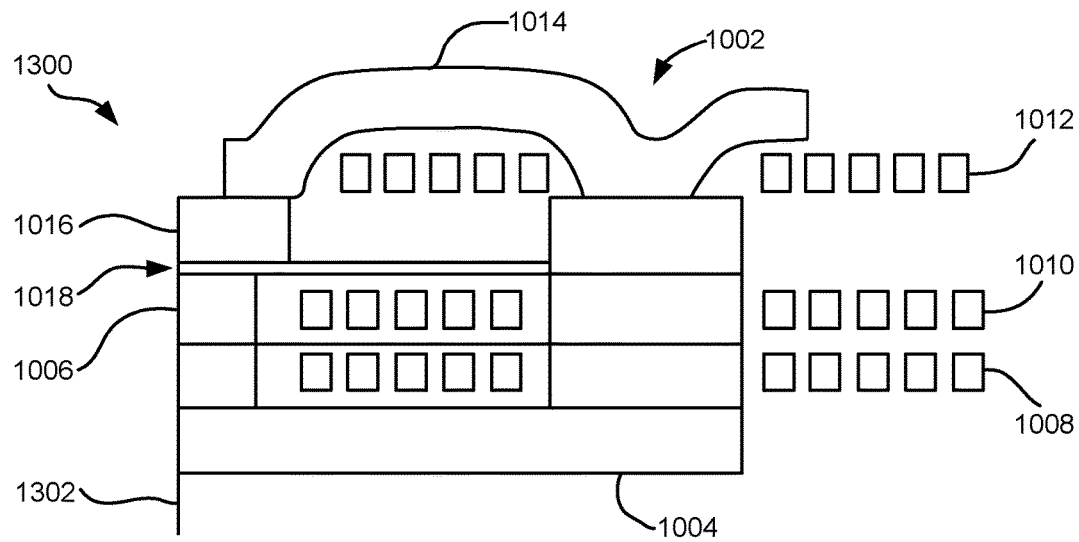

Referring to FIG. 13D, the remainder of the write transducer 1002 is formed, including the write gap 1018, upper pole 1014 and upper pole tip 1016 and upper coil 1012.

Figure 14:
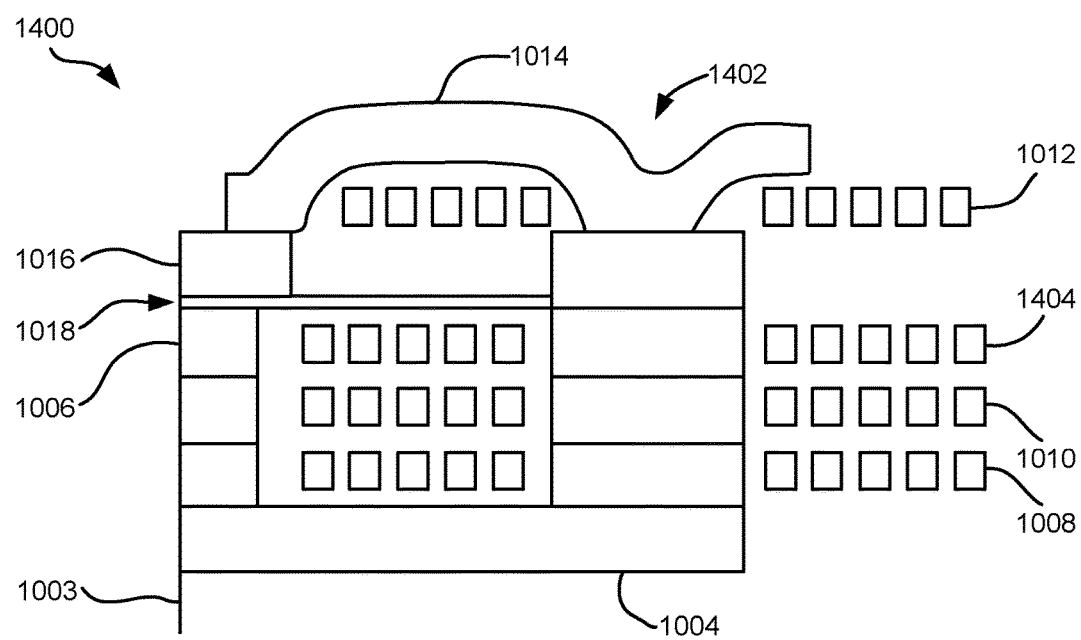
FIG. 14 depicts a magnetic recording tape writing apparatus having multiple write coil layers where two intermediate coil layers are positioned below the write gap, in accordance with one embodiment.

The method 1300 of FIGS. 13A-D may be readily extended to form additional layers of coils, e.g., by repeating the steps corresponding to FIG. 13C. FIG. 14 depicts an apparatus 1400 similar to apparatus 1000 of FIG. 10, but the write transducer 1402 has an additional intermediate coil layer 1404. As shown, both intermediate coil layers 1010, 1404 are positioned below the write gap 1018.

Similarly, variations of the apparatus 1100 of FIG. 11, where two or more intermediate coil layers are positioned above the write gap are provided in other embodiments.

It will be clear that the various features of the foregoing systems and/or methodologies may be combined in any way, creating a plurality of combinations from the descriptions presented above.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording tape writing apparatus, comprising:
   an array of write transducers extending along a common tape bearing surface, each of the write transducers having:
     a lower pole having a lower pole tip;
     a lower coil layer above the lower pole;
     an intermediate coil layer above the lower coil layer;
     an upper coil layer above the intermediate coil layer;
     an upper pole above the upper coil layer, the upper pole having an upper pole tip, the upper coil layer having multiple coil turns positioned between the upper pole and the intermediate coil layer, wherein the multiple coil turns are in a common plane of deposition, the intermediate coil layer having a plurality of turns in a second common plane of deposition, wherein the intermediate coil layer has more coil turns than the upper coil layer;
     a nonmagnetic write gap between the pole tips, a plane of deposition of the write gap extending between the intermediate coil layer and the upper coil layer; and
     a layer positioned between the write gap and the upper pole tip, the layer having a higher magnetic moment than the upper pole,
     wherein a width of each coil, measured along a respective plane of deposition thereof in a track width direction, is less than 44 microns.

2. An apparatus as recited in claim 1, wherein the lower pole tip is notched.

3. An apparatus as recited in claim 1, comprising a layer positioned between the write gap and the lower pole tip, the layer having a higher magnetic moment than the lower pole.

4. An apparatus as recited in claim 1, comprising a second intermediate coil layer between the lower coil layer and the intermediate coil layer, the second intermediate coil layer having a plurality of turns in a third common plane of deposition.

5. An apparatus as recited in claim 1, wherein an upper surface of the upper pole tip is planar, wherein the upper pole positioned has a media facing side positioned above the upper pole tip, wherein the media facing side of the upper pole is oriented substantially perpendicular to the upper surface of the upper pole, wherein the media facing side of the upper pole is recessed from a plane extending along a media facing side of the upper pole tip.

6. An apparatus as recited in claim 5, wherein the upper coil layer is positioned above a plane extending along the upper surface of the upper pole tip.

7. An apparatus as recited in claim 1, wherein the array includes at least 32 write transducers.

8. An apparatus as recited in claim 1, further comprising:
a drive mechanism for passing a magnetic medium over the array of write transducers; and
a controller electrically coupled to the write transducers.

9. An apparatus as recited in claim 1, wherein the lower pole tip has a notched feature in a media facing surface thereof, wherein the notched feature has a width extending parallel to the media facing surface thereof that is less than a widest width of the lower pole tip.

10. An apparatus as recited in claim 1, wherein the upper coil layer is positioned above a plane extending along a planar upper surface of the upper pole tip.

11. A magnetic recording tape writing apparatus, comprising:
an array of write transducers extending along a common tape bearing surface, each of the write transducers having:
a lower pole having a lower pole tip;
a lower coil layer above the lower pole;
an intermediate coil layer above the lower coil layer;
a second intermediate coil layer between the lower coil layer and the intermediate coil layer;
an upper coil layer formed above the intermediate coil layer;
an upper pole above the upper coil layer, the upper pole having an upper pole tip, the upper pole having an arcuate cross-sectional profile, the upper coil layer having multiple coil turns positioned between the upper pole and the intermediate coil layer, wherein the multiple coil turns are in a common plane of deposition, the second intermediate coil layer having a plurality of turns in a second common plane of deposition;
a nonmagnetic write gap between the pole tips, a plane of deposition of the write gap extending between the intermediate coil layer and the upper coil layer; and
a layer positioned between the write gap and the upper pole tip, the layer having a higher magnetic moment than the upper pole.

12. An apparatus as recited in claim 11, wherein the lower pole tip is notched.

13. An apparatus as recited in claim 11, comprising a layer positioned between the write gap and the lower pole tip, the layer having a higher magnetic moment than the lower pole.

14. An apparatus as recited in claim 11, wherein a width of each coil, measured along a respective plane of deposition thereof in a track width direction, is less than 42 microns.

15. An apparatus as recited in claim 11, wherein the array includes at least 32 write transducers.

16. An apparatus as recited in claim 11, wherein the upper coil layer is positioned above a plane extending along a planar upper surface of the upper pole tip.

17. An apparatus as recited in claim 11, further comprising:
a drive mechanism for passing a magnetic medium over the array of write transducers; and
a controller electrically coupled to the write transducers.

18. A magnetic recording tape writing apparatus, comprising:
an array of write transducers extending along a common tape bearing surface, each of the write transducers having:
a lower pole having a lower pole tip;
a lower coil layer above the lower pole;
an intermediate coil layer above the lower coil layer;
an upper coil layer above the intermediate coil layer;
an upper pole above the upper coil layer,
the upper pole having an upper pole tip, an upper surface of the upper pole tip being planar,
the upper pole having an arcuate cross-sectional profile,
the upper coil layer having multiple coil turns positioned between the upper pole and the intermediate coil layer,
wherein the turns of the upper coil layer are positioned above a plane extending along the planar upper surface of the upper pole tip,
wherein the multiple coil turns are in a common plane of deposition, the intermediate coil layer having multiple coil turns positioned in a second common plane of deposition,
wherein the intermediate coil layer has more coil turns than the upper coil layer;
a nonmagnetic write gap between the pole tips, a plane of deposition of the write gap extending between the intermediate coil layer and the upper coil layer; and
a layer positioned between the write gap and the upper pole tip, the layer having a higher magnetic moment than the upper pole.

19. An apparatus as recited in claim 18, wherein the lower pole tip has a notched feature in a media facing surface thereof, wherein the notched feature has a width extending parallel to the media facing surface thereof that is less than a widest width of the lower pole tip, wherein the upper pole positioned has a media facing side positioned above the upper pole tip, wherein the media facing side of the upper pole is oriented substantially perpendicular to the upper surface of the upper pole, wherein the media facing side of the upper pole is recessed from a plane extending along a media facing side of the upper pole tip.

* * * * *